United States Patent
Wong et al.

(10) Patent No.: US 10,955,395 B2
(45) Date of Patent: Mar. 23, 2021

(54) RUTHENIUM COMPLEX FOR USE IN NITRITE DETECTION

(71) Applicant: City University of Hong Kong, Kowloon (HK)

(72) Inventors: Chun-Yuen Wong, Kowloon (HK); Hoi-Shing Lo, New Territories (HK)

(73) Assignee: City University of Hong Kong, Kowloon (HK)

( * ) Notice: Subject to any disclaimer, the term of this patent is extended or adjusted under 35 U.S.C. 154(b) by 596 days.

(21) Appl. No.: 15/646,228

(22) Filed: Jul. 11, 2017

(65) Prior Publication Data

US 2019/0017980 A1    Jan. 17, 2019

(51) Int. Cl.
*G01N 31/22*    (2006.01)
*G01N 21/78*    (2006.01)
*C07F 15/00*    (2006.01)

(52) U.S. Cl.
CPC ....... *G01N 31/227* (2013.01); *C07F 15/0046* (2013.01); *G01N 21/78* (2013.01)

(58) Field of Classification Search
CPC .... C07F 15/0046; G01N 31/227; G01N 21/78
See application file for complete search history.

(56) References Cited

PUBLICATIONS

Hoi-Shing Lo, Ka-Wai Lo, Chi-Fung Yeung, Chun-Yuen Wong CCDC 1519936: Experimental Crystal Structure Determination, 2017, DOI: 10.5517/ccdc.csd.cc1n0m6h; Deposited on Nov. 30, 2016 (Year: 2016).*

Blanck, S. et al. "Bioactive cyclometalated phthalimides: design, synthesis and kinase inhibition," Dalton Trans., 2012, 41, 9337 (Year: 2012).*

\* cited by examiner

*Primary Examiner* — Christopher Adam Hixson
*Assistant Examiner* — Michelle Adams
(74) *Attorney, Agent, or Firm* — Renner Kenner Greive Bobak Taylor & Weber

(57) ABSTRACT

In various embodiments the present invention is directed to a complex for use in detecting nitrite, a method for making the complex, and a method for detecting nitrite with the complex. The complex comprises a structure of Formula (I)

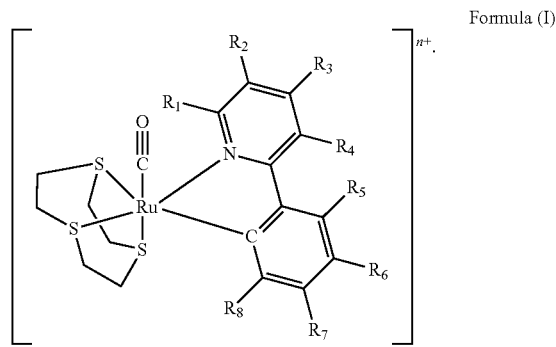

Formula (I)

where $R_1$, $R_2$, $R_3$, $R_4$, $R_5$, $R_6$, $R_7$ and $R_8$ are independently selected from hydrogen, a halogen atom, a C1-C4 straight or branched alkyl group, a C1-C4 straight or branched alkoxyl group, a phenyl group or a heterocyclic group, or any two of $R_1$, $R_2$, $R_3$, $R_4$, $R_5$, $R_6$, $R_7$ and $R_8$ together form a phenyl group and the others are independently selected from hydrogen, a halogen atom, a C1-C4 straight or branched alkyl group, a C1-C4 straight or branched alkoxyl group, or a hydroxyl group, where said phenyl group is optionally substituted with a C1-C4 alkyl group or a halogen atom; and wherein n is an integer selected from 0, 1 or 2.

26 Claims, 5 Drawing Sheets

(a) Previous work:

solv = CH₃CN, EtOH or DMSO (b) This work:

$$NO_2^- + 2H^+ \longrightarrow NO^+ + H_2O \qquad eq.\ (1)$$

RuNPY

[Ru(npy)([9]aneS3)(CO)]⁺
Pale Yellow

[Ru(NO-npy)([9]aneS3)(CO)]²⁺
Red eq. (2)

RUTHENIUM COMPLEX FOR USE IN NITRITE DETECTION

FIELD OF INVENTION

The invention relates to a ruthenium complex, a method of manufacturing the complex, and a nitrite detection assay using the complex.

BACKGROUND

Nitrite ion ($NO_2^-$) is recognized as both a surface water and a groundwater contaminant from agricultural activities, improper wastewater discharge and atmospheric precipitation, and the exposure to $NO_2^-$ is of great concern to public health [1-3]. Unintended long-term and/or high-level intake of $NO_2^-$ is known to create health problems including infantile methemoglobinemia (also known as blue baby syndrome), increased incidence of cancer, or even death [1, 2, 4, 5]. Therefore, nitrite is one of the water quality parameters for various water bodies. Currently, World Health Organization (WHO) and U.S. Environmental Protection Agency (U.S. EPA) recommend the guideline value and maximum contaminant level (MCL) of $NO_2$ for drinking water to be 3 mg $L^{-1}$ as nitrite and 1 mg $L^{-1}$ as nitrite-nitrogen, respectively [6, 7]. Moreover, quantitative analysis of $NO_2^-$ is also important in physiological studies because $NO_2^-$ and nitrate ($NO_3^-$) are surrogate markers for nitric oxide (NO) which plays important roles in many metabolic functions (e.g. neurotransmitter, thrombosis) and immune systems; measurements of $NO_2$ and $NO_3^-$ would provide valuable information regarding in vivo NO production [4, 8-10].

Several strategies have been developed for $NO_2^-$ analysis in water or biological samples, including spectroscopic, electrochemical, and chromatographic methods [2]. Among these methods, colorimetric detection has attracted much interest due to its sensitivity, simplicity and more importantly, ability to observe the results by naked eye [11-14]. The Griess assay, developed in 1858, is still the most commonly used colorimetric $NO_2^-$ detection method to date [15]. Despite its popularity, the Griess assay or its modified versions are known to suffer from (1) long incubation time for color development: at least 15 min is needed for the completion of coupling reaction between sulfanilamide and N-(1-naphthyl)-ethylenediamine even at elevated temperature [16, 17], and (2) serious interferences from many common ions [3]. Long incubation time (>10 min) is also required for the 2,3-diaminonaphthalene (DAN) assay [18], a popular fluorometric alternative to the Griess assay. So far, development of fast and convenient spectrophotometric assay which allows on-site visual detection of $NO_2^-$ remains a challenge.

An aim of the invention therefore is to provide a complex for use in detecting nitrite ions which overcomes the above issues.

SUMMARY OF INVENTION

In an aspect of the invention there is provided a complex comprising a structure of Formula (I)

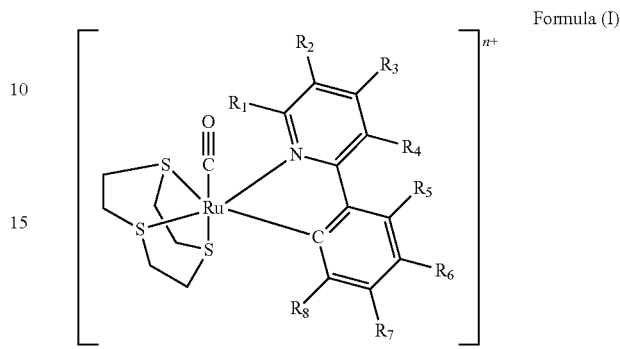

Formula (I)

wherein $R_1$, $R_2$, $R_3$, $R_4$, $R_5$, $R_6$, $R_7$ and $R_8$ are independently selected from hydrogen, a halogen atom, a C1-C4 straight or branched alkyl group, a C1-C4 straight or branched alkoxyl group, a phenyl group or a heterocyclic group, or any two of $R_1$, $R_2$, $R_3$, $R_4$, $R_5$, $R_6$, $R_7$ and $R_8$ together form a phenyl group and the others are independently selected from hydrogen, a halogen atom, a C1-C4 straight or branched alkyl group, a C1-C4 straight or branched alkoxyl group, or a hydroxyl group, where said phenyl group is optionally substituted with a C1-C4 alkyl group or a halogen atom;

n is an integer selected from 0, 1 or 2.

Advantageously the complex is an efficient $NO^+$ trapping agent and can be used for visual and spectrophotometric $NO_2^-$ detection.

In one embodiment any two of $R_1$, $R_2$, $R_3$, $R_4$, $R_5$, $R_6$, $R_7$ and $R_8$ together form a phenyl group and the others are independently selected from hydrogen, a halogen atom, a C1-C4 straight or branched alkyl group, a C1-C4 straight or branched alkoxyl group, or a hydroxyl group, where said phenyl group is optionally substituted with a C1-C4 alkyl group or a halogen atom.

In one embodiment the complex comprises a structure of Formula (II)

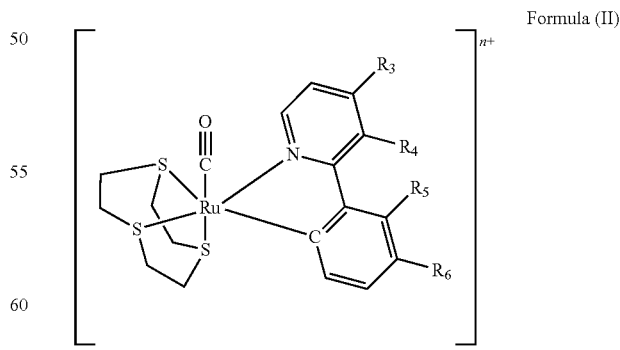

Formula (II)

wherein $R_3$ and $R_4$, $R_4$ and $R_5$, or $R_5$ and $R_6$ together form a phenyl group and the others are independently selected from hydrogen, a halogen atom, or a C1-C4 straight or branched alkyl group.

In one embodiment the complex comprises a structure selected from the group consisting of:

Formula (III)

Formula (IV)

Formula (V)

Formula (VI)

In one embodiment the complex comprises a structure of Formula (VII)

Formula (VII)

In one embodiment the complex comprises [Ru(npy)([9]aneS3)(CO)][ClO₄], where npy is 2-(1-naphthyl)pyridine and [9]aneS3 is 1,4,7-trithiacyclononane.

In one embodiment the complex is a monocation which is yellow in solution.

In one embodiment the monocation is capable of reacting with a nitrosonium ion to form a dication comprising a structure of Formula (VIII):

Formula (VIII)

Typically the dication is red in solution Typically the nitrosonium ion is derived from nitrite in solution.

In one embodiment the dication is formed from the monocation within one minute in the presence of nitrite and HCl.

In an aspect of the invention, there is provided a method for making the aforementioned complex comprising the steps of:

mixing [Ru([9]aneS3)(CH$_3$CN)$_3$](CF$_3$SO$_3$)$_2$, where [9]aneS3 is 1,4,7-trithiacyclononane;

2-(1-naphthyl)pyridine, and

Et$_3$N in a solvent of DMF;

warming the solution in an inert atmosphere;

removing the solvent to form a green residue;

eluting the residue using chromatography to collect a yellow band;

adding a saturated aqueous NaClO$_4$ solution to form yellow solids;

charging the yellow solids with DMF into a pressurised container containing CO gas to form an orange mixture;

warming the orange mixture;

removing the solvent to form yellow solids; and recrystallizing the yellow solids by slow diffusion of Et$_2$O into a solvent to form pale yellow crystals.

In one embodiment the [Ru([9]aneS3)(CH$_3$CN)$_3$](CF$_3$SO$_3$)$_2$, 2-(1-naphthyl)pyridine and Et$_3$N are mixed in a molar ratio of approximately 10:15:17 respectively.

In one embodiment the solution is warmed at around 60° C. for about 18 h. Typically the inert atmosphere comprises argon.

In one embodiment the solvent is removed after the solution is allowed to cool to room temperature.

In one embodiment the residue is eluted using basic alumina column chromatography and (CH$_3$)$_2$CO as eluent.

Typically the eluent is removed under vacuum after the NaClO$_4$ solution is added.

In one embodiment the CO is pressurised at 3 bar.

In one embodiment the orange mixture was warmed at around 120° C. for about 18 h.

In one embodiment the solvent in which the yellow crystals are formed is an acetonitrile solution.

In a further aspect of the invention, there is provided a method for detecting nitrite comprising the steps of:

adding an acid and a sample to a solution comprising a complex according to claim 1, where the complex comprises a structure of Formula (I)

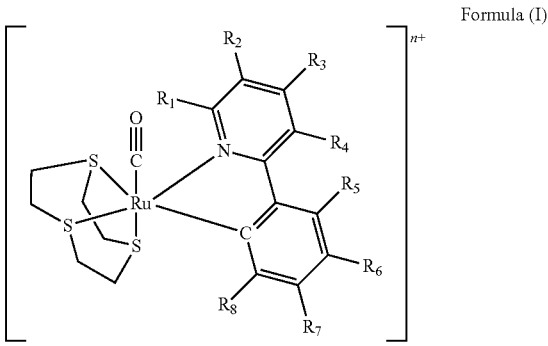

Formula (I)

wherein $R_1$, $R_2$, $R_3$, $R_4$, $R_5$, $R_6$, $R_7$ and $R_8$ are independently selected from hydrogen, a halogen atom, a C1-C4 straight or branched alkyl group, a C1-C4 straight or branched alkoxyl group, a phenyl group or a heterocyclic group, or any two of $R_1$, $R_2$, $R_3$, $R_4$, $R_5$, $R_6$, $R_7$ and $R_8$ together form a phenyl group and the others are independently selected from hydrogen, a halogen atom, a C1-C4 straight or branched alkyl group, a C1-C4 straight or branched alkoxyl group, or a hydroxyl group, where said phenyl group is optionally substituted with a C1-C4 alkyl group or a halogen atom;

n is an integer selected from 0, 1 or 2;

mixing the solution at room temperature; and
checking the solution for any change in colour.

In one embodiment, the acid is hydrochloric acid (HCl) and the complex comprises a structure of Formula (VII)

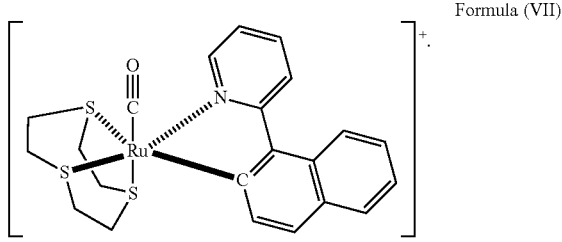

Formula (VII)

Preferably, after the addition of the acid and the sample to the complex solution, the solution is mixed for at least 30 seconds or about 1 minute at room temperature, before determining the colour change at room temperature.

In one embodiment 0.2 ml of [Ru(npy)([9]aneS3)(CO)]$^+$ solution is mixed with 0.2 ml sample solution. Typically 1 ml of HCl is added at a concentration of 1 mol L$^{-1}$. It will be appreciated that other acids, concentrations and amounts could also be used to achieve similar results.

Typically the solution changes from yellow to red if the sample contains nitrite.

Typically the dynamic detection range is 1-840 μmol L$^{-1}$.

In one embodiment the change in colour can be determined by the naked eye. Typically the minimum nitrite concentration detectable in this way is in the range 21-42 μmol L$^{-1}$.

In an alternative embodiment the change in colour can be determined by a spectrophotometer. Typically the change in colour is measured at around 483 nm. It will be appreciated that measurement at wavelengths between 450 nm and 550 nm could also be used. Typically the minimum nitrite concentration detectable in this way is 0.39 μmol L$^{-1}$.

In one embodiment the colour can be stabilised by adding ammonia solution to neutralise and/or alkalinize the solution.

In one embodiment the colour change is not significantly altered by other ions or urine in the solution.

The assay includes the advantages of:
(1) rapid (ca. 1 min) and apparent color change (from pale yellow to red) at room temperature;
(2) wide dynamic range (1-840 μmol L$^{-1}$) with limit of detection (LOD, 36) of 0.39 μmol L$^{-1}$, and
(3) high selectivity even in the presence of various common interfering species.

Significantly, the detection method can be applied to tap water and human urine samples.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

DETAILED DESCRIPTION

Figure 1:
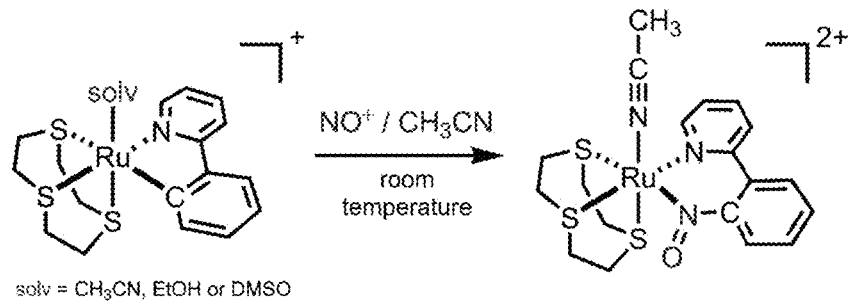
FIG. 1 illustrates an insertion reaction of nitrosonium ion (NO$^+$) into the RuC bond of cyclometalated ruthenium complexes (a) as previously reported; (b) according to an embodiment of the invention, showing the working principle of the RuNPY assay.
Figure 1:
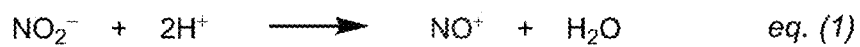
Figure 1:
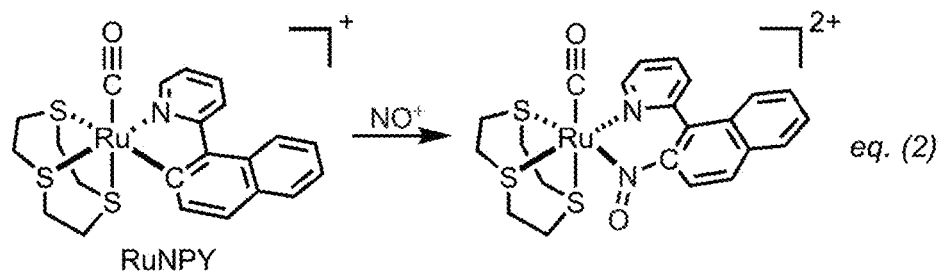

Regarding the working principle of NO$_2$ detection, many colorimetric [19-25] and fluorometric assays [25-28] are based on trapping the nitrosonium ion (NO$^+$) generated from acidified NO$_2$ to form chromophores and luminophores for spectroscopic measurements. For example, NO$^+$ is trapped by sulfanilamide for the formation of azo dye in the Griess assay, and is trapped by 2,3-diaminonaphthalene to give the fluorescent 2,3-naphthotriazole in the DAN assay. On the other hand, trapping of NO$^+$ by inorganic species as a NO$_2$ detection mechanism is sparse in the literature.

1. EXPERIMENTAL SECTION

1.1 Chemicals and Materials

All reagents were used as received, and solvents were purified by standard methods. [Ru([9]aneS3)(dmso)Cl$_2$] and [Ru([9]aneS3)(CH$_3$CN)$_3$](CF$_3$SO$_3$)$_2$ were prepared according to literature procedure [29]. $^1$H and $^{13}$C{$^1$H} NMR spectra were recorded on a Bruker 400 DRX FT-NMR spectrometer. Peak positions were calibrated with solvent residue peaks as internal standard. Electrospray mass spectrometry was performed on a PE-SCIEX API 3000 triple quadrupole mass spectrometer. Infrared spectrum was recorded as KBr plates on a Perkin-Elmer FTIR-1600 spectrophotometer. UV-visible spectra were recorded on a Shimadzu UV-1800 spectrophotometer. Elemental analyses were done on an Elementar Vario Micro Analyzer. The sensing solution was prepared by dissolving RuNPY in acetonitrile (2 mmol L$^{-1}$). This sensing solution was stable under ambient conditions for at least 1 month. Standard solutions of sodium nitrite were prepared by appropriate dilution of the stock solution (10 mmol L$^{-1}$). NaNO$_2$, Na$_3$PO$_4$ and Cd(NO$_3$)$_2$ were purchased from International Laboratory USA (South San Francisco, Calif.). NaCl, NaBr, NaHCO$_3$, NaClO$_4$, CuCl$_2$ and Zn(NO$_3$)$_2$ were purchased from Acros Organics (Geel, Belgium). KNO$_3$, Na$_2$SO$_3$, Na$_2$SO$_4$, Co(OAc)$_2$, NiCl$_2$, NaOH, HCl (>37%), NH$_4$OH (ca. 25% assayed as NH$_3$), urea and uric acid were purchased from Sigma-Aldrich (St. Louis, Mo.). ZnSO$_4$ was purchased from BDH Chemicals (Poole, England). Na$_2$CO$_3$ and CaCl$_2$) were purchased from Uni-chem (China). All chemicals used were of analytical grade and used as received. Acetonitrile of HPLC grade was purchased from Anaqua Chemical Supply (Houston, Tex.). Ultrapure water (Millipore, DirectQ system) with a resistivity of 18.2 MΩ·cm was used throughout the experiment.

1.2 X-Ray Crystallography

Single crystals of RuNPY.CH$_3$CN were obtained by slow diffusion of Et$_2$O into an acetonitrile solution of RuNPY. A suitable crystal was selected and measured on an Oxford Diffraction Gemini S Ultra X-ray single crystal diffractometer. The crystal was kept at 173 K during data collection. Using Olex2 [30], the structure was solved with the ShelXS [31] structure solution program using Patterson Method and refined with the ShelXL [32] refinement package using Least Squares minimization.

1.3 Synthesis of RuNPY

A mixture of [Ru([9]aneS3)(CH$_3$CN)$_3$](CF$_3$SO$_3$)$_2$ (0.250 g, 0.355 mmol), 2-(1-naphthyl)pyridine (0.109 g, 0.533 mmol) and Et$_3$N (0.061 g, 0.604 mmol) in 10 mL DMF were warmed at 60° C. for 18 h under an argon atmosphere. Upon cooling to room temperature, the solvent was removed to give a green residue. This crude product was eluted by column chromatography (basic alumina, (CH$_3$)$_2$CO as eluent) and the yellow band was collected. A saturated aqueous NaClO$_4$ solution (5 mL) was added and the (CH$_3$)$_2$CO was removed under vacuum to give yellow solids. The solids, together with 10 mL of DMF, were charged into a sealed glass container pressurized with 3 bar of CO gas. The orange mixture was then warmed at 120° C. for 18 hr. Upon cooling to room temperature, the solvent was removed and the resultant yellow solids were recrystallized by slow diffusion of Et$_2$O into an acetonitrile solution to give pale yellow crystals. Yield: 0.115 g, 60%. Anal. Calcd for C$_{22}$H$_{22}$NO$_5$S$_3$RuCl: C, 43.10; H, 3.62; N, 2.28. Found: C, 43.12; H, 3.65; N, 2.20. $^1$H NMR (400 MHz, CD$_3$CN): δ 2.31-2.38, 2.60-2.70, 2.76-2.91, 2.98-3.21 (m, 12H, [9]aneS3); 7.25 (t, 1H, J=6.5 Hz, npy), 7.44 (t, 1H, J=7.5 Hz, npy), 7.58 (t, 1H, J=7.7 Hz, npy), 7.68 (d, 1H, J=8.1 Hz, npy), 7.83, (d, 1H, J=8.1 Hz, npy), 7.93 (d, 1H, J=8.1 Hz, npy), 8.01 (t, 1H, J=7.9 Hz, npy), 8.50, (d, 1H, J=8.7 Hz, npy.), 8.55, (d, 1H, J=8.3 Hz, npy), 8.63, (d, 1H, J=5.5 Hz, npy). $^{13}$C NMR (100 MHz, CD$_3$CN): δ 31.1, 32.8, 34.4, 35.5, 36.1, 37.2 ([9]aneS3); 123.2, 123.4, 125.1, 125.5, 128.2, 130.2, 130.5, 137.6, 139.5, 155.0 (npy); 131.9, 133.4, 141.2, 167.4, 172.8 (5 quaternary carbons of npy), 195.9 (CO). IR (KBr, ν$_{C=O}$=1959. ESI-MS: m/z 514 [M$^+$].

1.4 UV-Vis Absorption Measurements

UV-Vis absorption spectra were recorded on a Shimadzu UV-1800 spectrophotometer with a quartz cuvette with optical path length of 1 cm. In a typical measurement, 1 mL of HCl (1 mol L$^{-1}$) was first mixed with 0.2 mL of samples or NO$_2^-$ standard solutions. Secondly, 0.2 mL of sensing solution (2 mmol L$^{-1}$ RuNPY) was added into the above mixture and vortexed for 1 min to produce color change. Finally, the resultant mixture was alkalinized by adding ammonium hydroxide (0.2 mL, ca. 25%) and the absorption spectra were collected by UV-Vis spectrophotometer.

1.5 Sample Preparation for Human Urine Analysis

Human urine samples were obtained from three self-reported healthy male volunteers aged from 24-28. The analysis were performed within 2 hr after urine collection. After spiking known amount of NaNO$_2$ into the urine samples, deproteinization was carried out according to literature reported method [33]. Briefly, 2.0 mL of urine spiked with NaNO$_2$ was added into a mixture of 0.2 mL of 1 mol L$^{-1}$ NaOH and 1.2 mL of 0.15 mol L$^{-1}$ ZnSO$_4$ at 0° C. and stirred for 15 min. The resultant mixture was centrifuged at 13000 rpm for 5 min and the supernatant was collected. Three urine aliquots (150 μL) were spiked with 50 μL of NO$_2^-$ standard solutions to give two concentrations (25 μmol L$^{-1}$ and 50 μmol L$^{-1}$). The NO$_2^-$ concentration in urine samples were then analyzed by standard addition method.

2. RESULTS AND DISCUSSION

2.1 Working Principle and Design of the RuNPY Assay

The working principle of the RuNPY assay is based on a fast reaction between NO and cyclometalated Ru(II) complexes discovered previously [34-36]. Briefly, Ru(II) complexes bearing orthometalated 2-arylpyridine react with NO to give 2-(2-nitrosoaryl)pyridine-ligated Ru(II) complexes (FIG. 1(a)). Significantly, this reaction proceeds smoothly to completion within 1 min at room temperature, suggesting that the cyclometalated Ru(II) complexes are efficient NO trapping agents. In view of the fast kinetics, this reaction is exploited to develop a rapid and convenient spectrophotometric NO$_2$ assay.

Figure 2:
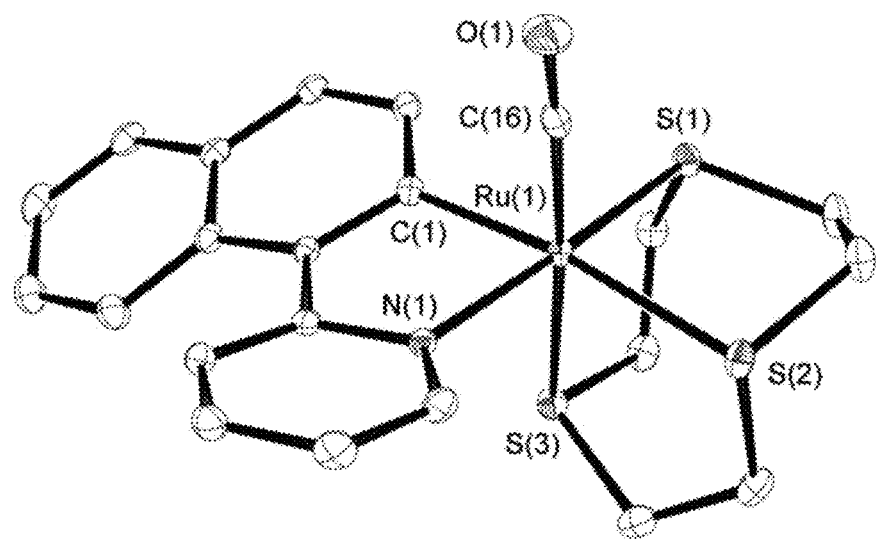
FIG. 2 illustrates a perspective view of the RuPNY cation of FIG. 1b, with H atoms omitted for clarity

FIG. 1(b) depicts the reactions involved in the RuNPY assay, which are (1) acidification of NO$_2^-$ to give NO$^+$ (eq. 1); and (2) trapping of NO$^+$ by RuNPY (eq. 2). Alkalinization of the reaction mixture can be done to stabilize the absorbance of the mixture if the solution is not measured immediately. RuNPY showcases excellent stability towards air and moisture compared with the previously reported [Ru(2-phenylpyridine)([9]aneS3)(solv)]$^+$ where solv= CH$_3$CN, EtOH or DMSO (FIG. 1(a)) [34, 35]. More specifically, the sensing solution, a 2 mmol L$^{-1}$ acetonitrile solution of RuNPY (denoted as RuNPY$^{soln}$), is stable for at least 1 month under ambient conditions. Furthermore, the more conjugated nature of npy makes both the RuNPY and the NO$^+$ inserted complex [Ru(NO-npy)([9]aneS3)(CO)]$^{2+}$ absorb in the visible region, which not only enables visual detection of NO$_2^-$ but also avoids interference from shorter wavelength absorptions due to sample matrix. The crystal structure of RuNPY was determined by X-ray crystallography, and the perspective view of its cation is depicted in FIG. 2. Thermal ellipsoids are at the 30% probability level.

2.2 Visual and Spectrophotometric $NO_2^-$ Detection

Figure 3:
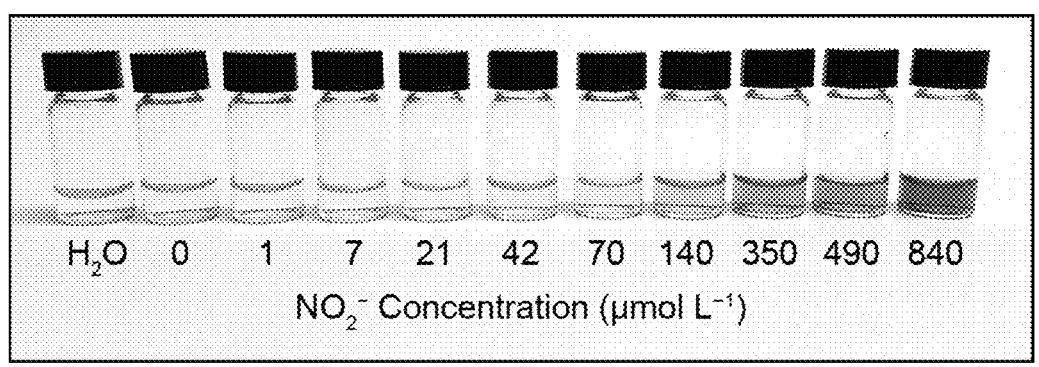
FIG. 3 is a photograph of RuPNY solutions with different concentrations of acidified NO$_2$ (0-840 μmol L$^{-1}$), and pure water (labeled as H$_2$O) included for color comparison.

The RuNPY method for visual detection of $NO_2^-$ was evaluated as follows: 1 mL of HCl (1 mol $L^{-1}$) was added to a mixture of 0.2 mL of standard $NaNO_2$ solution and 0.2 mL of RuNPY, followed by a 1-min mixing at room temperature. The reaction mixture, which was originally pale yellow in color, becomes red in the presence of $NO_2^-$ with an onset $NO_2^-$ concentration between 21 and 42 µmol $L^{-1}$ (FIG. 3). Because the guideline value and maximum contaminant level of $NO_2^-$ for drinking water set by WHO and U.S. EPA are 65 and 71 µmol $L^{-1}$ respectively, the RuNPY method is sensitive enough for drinking water monitoring by the naked eye.

Figure 4:
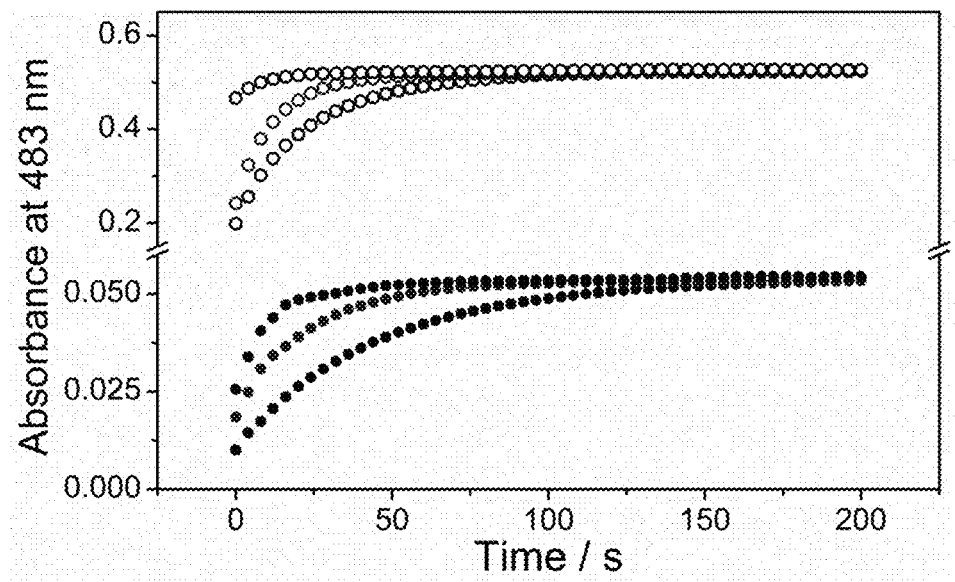
FIG. 4 is a chart illustrating time-dependent absorbance of RuNPY$^{soln}$ at 483 nm for 70 (closed circle) and 700 (open circle) μmol L$^{-1}$ of NO$_2^-$ upon addition of HCl with concentrations of 1, 0.75 and 0.5 mol L$^{-1}$.

The choices of the 1-min incubation time together with the concentration of HCl (1 mol $L^{-1}$) are based on kinetic and practical considerations. FIG. 4 shows the kinetic traces at 483 nm (the wavelength gives the largest absorbance response) upon adding HCl (0.5-1 mol $L^{-1}$) to mixtures of standard $NaNO_2$ solution (70 and 700 µmol $L^{-1}$) and RuNPY$^{soln}$. The rate of color development was slower at lower HCl concentration, an expected consequence of slower $NO^+$ generation according to eq.1 in FIG. 1(b). The HCl concentration of 1 mol $L^{-1}$ was found to allow completion of color development within 1 min for both high and low $NaNO_2$ concentration, and was therefore chosen for the RuNPY protocol. Although the usage of even higher HCl concentration would definitely further shorten the time for color development, it is not favored in view of sample preparation and disposal, especially for on-site detections that the experimental settings lack laboratory capacity. It is worthwhile to mention that the absorbance is very stable if the acidic reaction mixture is alkalinized with ammonia solution. For example, we found that the addition of 0.2 mL of 25% $NH_4OH$ solution to the sample-RuNPY$^{soln}$ mixture 1 min after the acidification step could stabilize the absorbance for at least 12 hr. We therefore suggest the use of this stabilization technique for prolonged or delayed spectroscopic measurements.

Figure 5:
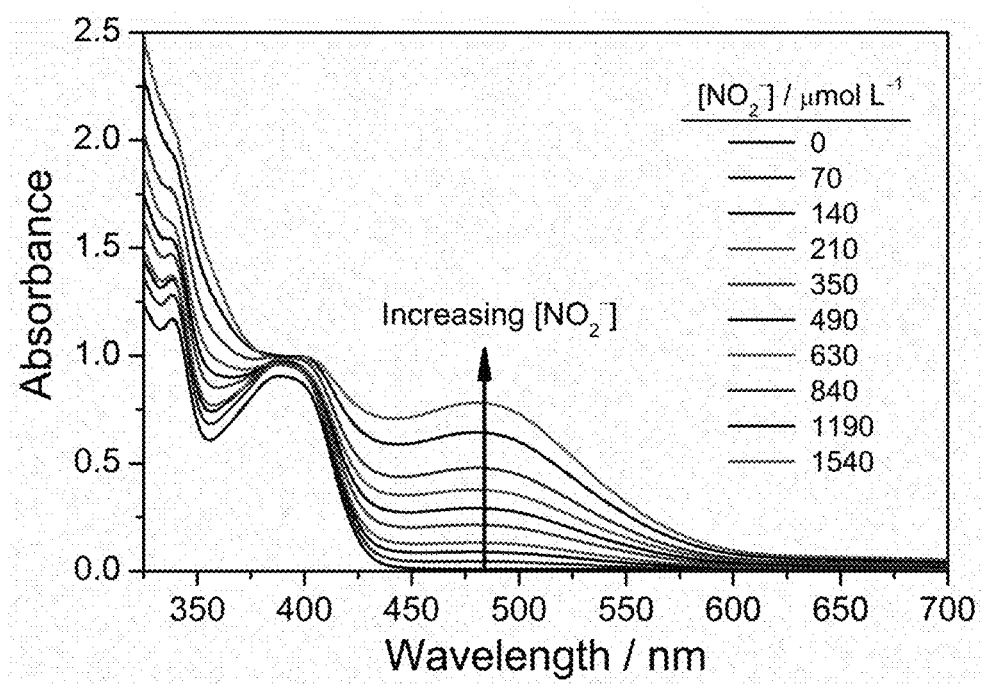
FIG. 5 is a chart illustrating absorption spectra for the RuNPY assay in the presence of various standard NaNO$_2$ solutions.

Absorption spectra for the RuNPY assay in the presence of various standard $NaNO_2$ solutions are depicted in FIG. 5. Measurements were done with $NH_4OH$ stabilization. RuNPY$^{soln}$ alone shows an absorption peak at 389 nm with no apparent absorption beyond 450 nm. Upon addition of acidified $NO_2^-$ a new absorption band appears between 450 to 600 nm with absorption maximum at 483 nm, which is assigned as d(Ru)→π* (NO-npy) metal-to-ligand charge-transfer (MLCT) transition. Although any wavelength between 450 to 600 nm can be used for $NO_2^-$ quantification, absorbance at 483 nm shows the largest response towards $NO_2^-$.

Figure 6:
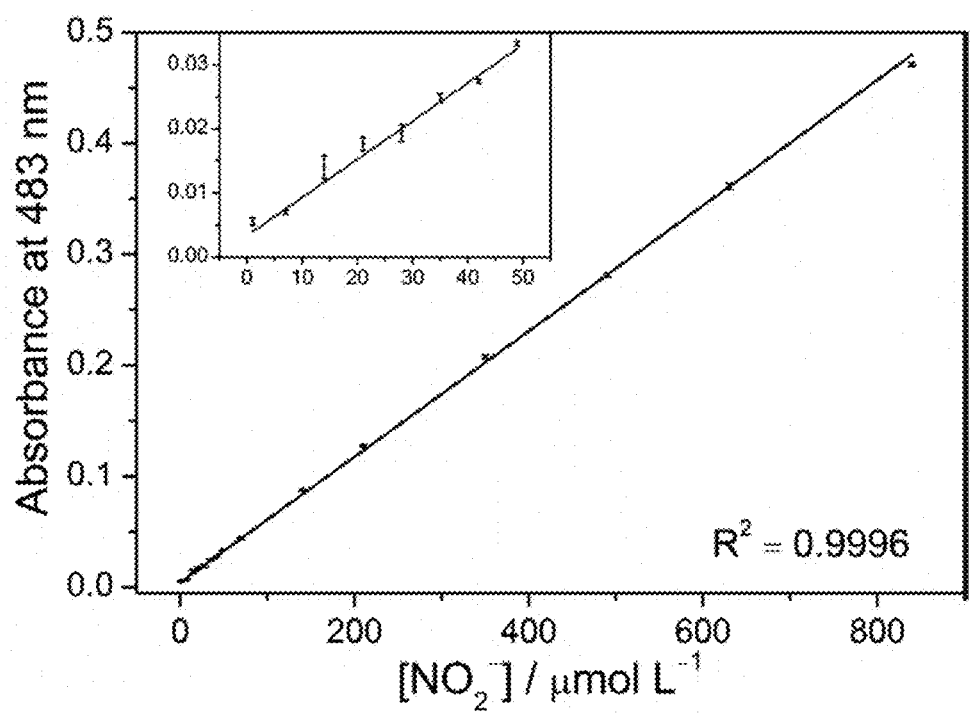
FIG. 6 is a chart illustrating an analytical curve in the NO$_2^-$ concentration ranges of up to 840 (main curve) and 50 (inset curve) μmol L$^{-1}$.

Correlation between the absorbance of the assay at 483 nm and the concentration of standard $NaNO_2$ solutions is depicted in FIG. 6. The error bar represents the standard deviation of 10 measurements. Measurements were done with $NH_4OH$ stabilization. The response of the assay is highly linear, with a $R^2$ value of 0.9996 for the $NO_2^-$ concentration ranging from 1 to 840 µmol $L^{-1}$. The limit of detection (LOD), defined as 3σ of the blank, is 0.39 µmol $L^{-1}$. This LOD value is significantly lower than the guideline value (65 µmol $L^{-1}$) and maximum contaminant level (71 µmol $L^{-1}$) of $NO_2^-$ for drinking water set by WHO and U.S. EPA respectively, and is comparable with many other spectrophotometric $NO_2^-$ assays (Table 1).

TABLE 1

Performance Comparison of the RuNPY assay with other $NO_2^-$ detection assays reported recently

| Assays | Dynamic range (µmol $L^{-1}$) | Detection limit (µmol $L^{-1}$) | Time required for color development (min) | Temperature for detection (° C.) | References |
|---|---|---|---|---|---|
| Modified gold nanorods | 5.2-100 | —[a] | 10 | 95 | [12] |
| RB-PDA | 2-10 | —[a] | 10 | RT[b] | [37] |
| Gold nanorods | 1-15 | 0.5 | 10 | 55 | [38] |
| TMB | 0.5-30 | 0.1 | 1 | RT[b] | [39] |
| Ag@Au nanoparticles | 1-20 | 0.1 | 165 | RT[b] | [40] |
| RuNPY | 1-840 | 0.39 | 1 | RT[b] | This work |

[a]Not mentioned in the literature report.
[b]RT = room temperature.

2.3 Selectivity Tests

Figure 7:
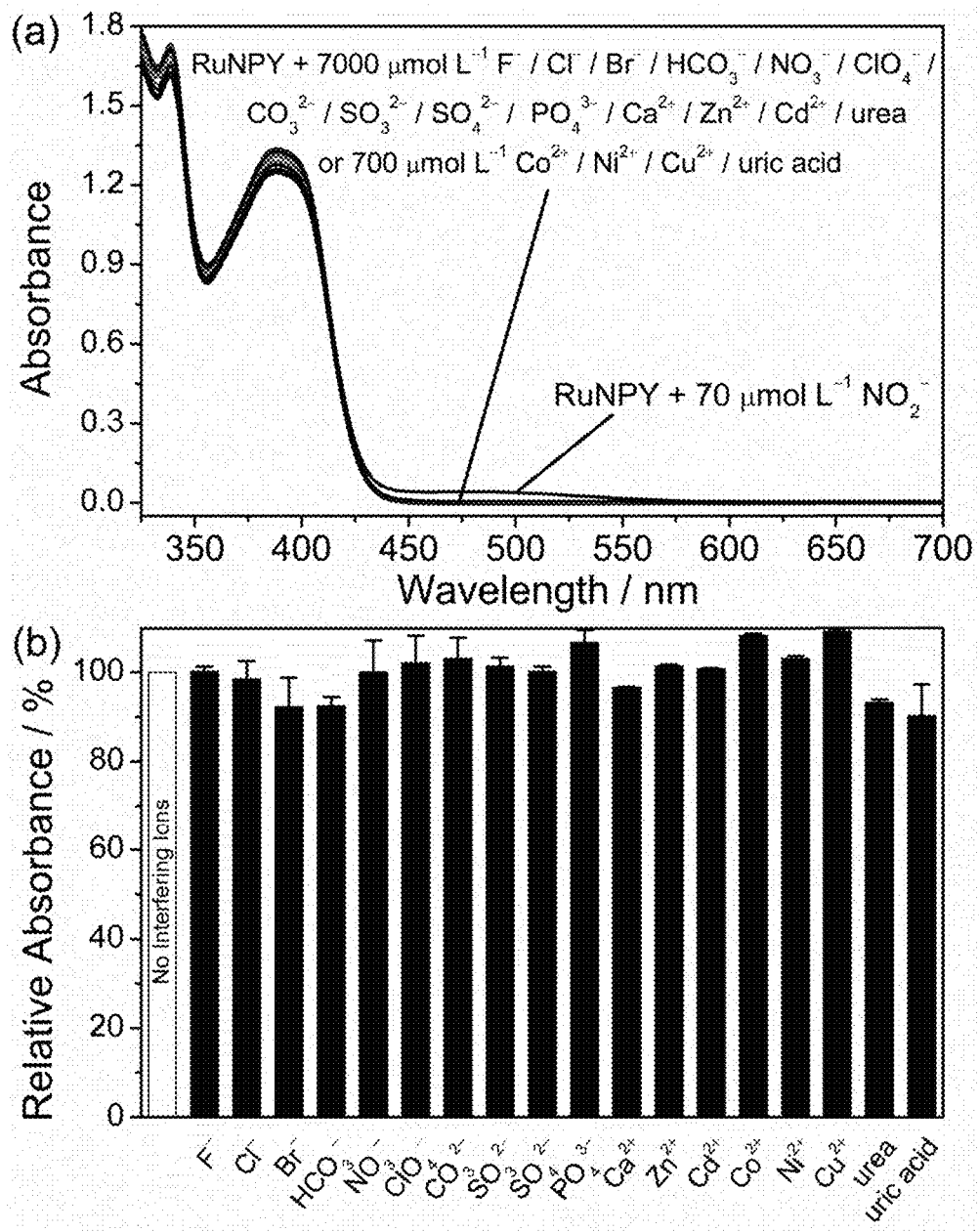
FIG. 7 is a chart illustrating selectivity tests of the RuNPY assay: (a) the absorption spectra of the assay with 70 μmol L$^{-1}$ of NO$_2^-$ or other species at higher concentrations (7000 or 700 μmol L$^{-1}$); (b) relative absorbance response at 483 nm of the assay to 7 μmol L$^{-1}$ of NO$_2^-$ in the presence and absence of 700 μmol L$^{-1}$ of other species (exception: 70 μmol L$^{-1}$ for Co$^{2+}$, Ni$^{2+}$, Cu$^{2+}$, and uric acid).

The detection of $NO_2^-$ by the RuNPY assay is highly selective. FIG. 7(a) depicts the absorption spectra of the assay in the presence of $NO_2$ (70 µmol $L^{-1}$) or other species at higher concentrations including 7000 µmol $L^{-1}$ of $F^-$, $Cl^-$, $Br^-$, $HCO_3^-$, $NO_3^-$, $ClO_4^-$, $Cl_3^{2-}$, $SO_3^{2-}$, $SO_4^{2-}$, $PO_4^{3-}$, $Ca^{2+}$, $Zn^{2+}$, $Cd^{2+}$ or urea, which clearly show that only $NO_2^-$ can induce a spectroscopic change to the assay, even the concentrations of other species are 100-fold of that of $NO_2$. Similar observation also holds for 700 µmol $L^{-1}$ of $Co^{2+}$, $Ni^{2+}$, $Cu^{2+}$ or uric acid (remark: the former three ions have intrinsic absorptions in the visible region, whereas uric acid has a low solubility in water). Moreover, interference tests using the aforementioned species demonstrate that the performance of the RuNPY assay towards $NO_2^-$ is not downgraded by the coexistence of other species. For example, the difference in the absorbance response to 7 µmol $L^{-1}$ of $NO_2^-$ between assays with and without the coexistence of 700 µmol $L^{-1}$ of other species (70 µmol $L^{-1}$ for $Co^{2+}$, $Ni^{2+}$, $Cu^{2+}$ and uric acid) are within ±10% (FIG. 7(b)).

2.4 Tap Water and Human Urine Testing

Determination of $NO_2^-$ in tap water and human urine samples were attempted to demonstrate the practicability of the RuNPY assay. For urine samples, standard addition was employed to eliminate matrix effects. Three tap water and three human urine samples, which originally had no detectable $NO_2^-$, were spiked with known amounts of $NO_2^-$ to give two concentrations (25 and 50 µmol L$^{-1}$). Recovery % ranging from 94-105 were obtained (Table 2), suggesting that the RuNPY assay is suitable for tap water and human urine testing.

TABLE 2

Recovery of NO$_2^-$ from Three Tap Water and Three Human Urine Samples

| Sample | NO$_2^-$ added (µmol L$^{-1}$) | NO$_2^-$ recovered (µmol L$^{-1a}$) | Recovery (%) |
|---|---|---|---|
| Tap Water | 0 | —$^b$ | — |
|  | 25 | 23.5 ± 0.3; 24.1 ± 1.3; 26.3 ± 1.5 | 94 ± 1.3; 96 ± 5.4; 105 ± 5.7 |
|  | 50 | 48.9 ± 3.2; 49.2 ± 3.0; 52.2 ± 1.2 | 98 ± 6.5; 98 ± 6.1; 104 ± 2.3 |
| Human Urine | 0 | —$^b$ | — |
|  | 25 | 23.9 ± 0.1; 24.7 ± 0.4; 25.9 ± 0.1 | 96 ± 0.4; 99 ± 1.6; 104 ± 0.4 |
|  | 50 | 46.9 ± 2.0; 47.9 ± 1.6; 52.1 ± 2.7 | 94 ± 4.3; 96 ± 3.4; 104 ± 5.2 |

$^a$Mean ± Standard Derivation (n = 3).
$^b$Not detected.

3. CONCLUSIONS

The rapidity, simplicity and selectivity of the newly developed RuNPY assay for NO$_2$ detection have been verified. Its limit of detection is well below the guideline values for drinking water recommended by WHO and U.S. EPA. Practical applications for tap water and human urine testing were successfully demonstrated. Overall, this method holds great potentials for on-site environmental and biological investigations.

It will be appreciated by persons skilled in the art that the present invention may also include further additional modifications made to the system which does not affect the overall functioning of the system.

REFERENCES

[1] J. C. Fanning, The chemical reduction of nitrate in aqueous solution, Coord. Chem. Rev., 199 (2000) 159-179.

[2] M. J. Moorcroft, J. Davis, R. G. Compton, Detection and determination of nitrate and nitrite: a review, Talanta, 54 (2001) 785-803.

[3] L. Nollet, L. S. P. De Gelder, Handbook of Water Analysis, Third Edition, CRC Press, Boca Raton, 2014.

[4] G. N. Hord, Y. Tang, N. S. Bryan, Food sources of nitrates and nitrites: the physiologic context for potential health benefits, Am. J. Clin. Nutr., 90 (2009) 1-10.

[5] A. Cockburn, G. Brambilla, M. Fernandez, D. Arcella, L. R. Bordajandi, B. Cottrill, C. van Peteghem, J. Dorne, Nitrite in feed: from animal health to human health, Toxicol. Appl. Pharmacol., 270 (2013) 209-217.

[6] World Health Organization. Nitrate and nitrite in drinking-water: Background document for development of WHO Guidelines for Drinking-water Quality. 2011. http://www.who.int/water_sanitation_health/dwq/chemicals/nitratenitrite2ndadd.pdf (Accessed: 26 Jan. 2017)

[7] United States Environmental Protection Agency. Ground water and drinking water: Table of regulated drinking water contaminants. https://www.epa.gov/ground-water-and-drinking-water/table-regulated-drinking-water-contaminants (Accessed: 26 Jan. 2017)

[8] K. Cosby, K. S. Partovi, J. H. Crawford, R. P. Patel, C. D. Reiter, S. Martyr, B. K. Yang, M. A. Waclawiw, G. Zalos, X. Xu, K. T. Huang, H. Shields, D. B. Kim-Shapiro, A. N. Schechter, R. O. Cannon III, M. T. Gladwin, Nitrite reduction to nitric oxide by deoxyhemoglobin vasodilates the human circulation, Nat. Med., 9 (2003) 1498-1505.

[9] A. Dejam, C. J. Hunter, A. N. Schechter, M. T. Gladwin, Emerging role of nitrite in human biology, Blood Cells Mol. Dis., 32 (2004) 423-429.

[10] N. S. Bryan, D. D. Alexander, J. R. Coughlin, A. L. Milkowski, P. Boffetta, Ingested nitrate and nitrite and stomach cancer risk: An updated review, Food Chem. Toxicol., 50 (2012) 3646-3665.

[11] W. L. Daniel, M. S. Han, J. Lee, C. A. Mirkin, Colorimetric Nitrite and nitrate detection with gold nanoparticle probes and kinetic end points, J. Am. Chem. Soc., 131 (2009) 6362-6363.

[12] N. Xiao, C. Yu, Rapid-response and highly sensitive noncross-linking colorimetric nitrite sensor using 4-aminothiophenol modified gold nanorods, Anal. Chem., 82 (2010) 3659-3663.

[13] Q. Xia, Y. Mao, J. Wu, T. Shu, T. Yi, Two-component organogel for visually detecting nitrite anion, J. Mater. Chem. C, 2 (2014) 1854-1861.

[14] N. Lopez-Ruiz, V. F. Curto, M. M. Erenas, F. Benito-Lopez, D. Diamond, A. J. Palma, L. F. Capitan-Vallvey, Smartphone-based simultaneous pH and nitrite colorimetric determination for paper microfluidic devices, Anal. Chem., 86 (2014) 9554-9562.

[15] E. Tatsch, G. V. Bochi, R. S. Pereira, H. Kober, V. A. Agertt, M. M. de Campos, P. Gomes, M. M. M. F. Duarte, R. N. Moresco, A simple and inexpensive automated technique for measurement of serum nitrite/nitrate, Clin. Biochem., 44 (2011) 348-350.

[16] J. Sun, X. Zhang, M. Broderick, H. Fein, Measurement of nitric oxide production in biological systems by using Griess reaction assay, Sensors, 3 (2003) 276-284.

[17] F. Romitelli, S. A. Santini, E. Chierici, D. Pitocco, B. Tavazzi, A. M. Amorini, G. Lazzarino, E. Di Stasio, Comparison of nitrite/nitrate concentration in human plasma and serum samples measured by the enzymatic batch Griess assay, ion-pairing HPLC and ion-trap GCMS: The importance of a correct removal of proteins in the Griess assay, J. Chromatogr. B, 851 (2007) 257-267.

[18] A. K. Nussler, M. Glanemann, A. Schirmeier, L. Liu, N. C. Nüssler, Fluorometric measurement of nitrite/nitrate by 2,3-diaminonaphthalene, Nat. Protoc., 1 (2006) 2223-2226.

[19] K. Horita, G. Wang, M. Satake, Spectrophotometric determination of nitrate and nitrite in soil and water samples with a diazotizable aromatic amine and coupling agent using column preconcentration on naphthalene supported with ion-pair of tetradecyldimethylbenzylammonium and iodide, Anal. Chim. Acta, 350 (1997) 295-303.

[20] M. N. Abbas, G. A. Mostafa, Determination of traces of nitrite and nitrate in water by solid phase spectrophotometry, Anal. Chim. Acta, 410 (2000) 185-192.

[21] K. M. Miranda, M. G. Espey, D. A. Wink, A rapid, simple spectrophotometric method for simultaneous detection of nitrate and nitrite, Nitric Oxide, 5 (2001) 62-71.

[22] L. Feng, H. Li, X. Li, L. Chen, Z. Shen, Y. Guan, Colorimetric sensing of anions in water using ratiometric indicator-displacement assay, Anal. Chim. Acta, 743 (2012) 1-8.

[23] V. V. Kumar, S. P. Anthony, Highly selective silver nanoparticles based label free colorimetric sensor for nitrite anions, Anal. Chim. Acta, 842 (2014) 57-62.

[24] J. Ahn, K. H. Jo, J. H. Hahn, Standard addition/absorption detection microfluidic system for salt error-free nitrite determination, Anal. Chim. Acta, 886 (2015) 114-122.

[25] Y. Shen, Q. Zhang, X. Qian, Y. Yang, Practical assay for nitrite and nitrosothiol as an alternative to the Griess assay or the 2,3-diaminonaphthalene assay, Anal. Chem., 87 (2015) 1274-1280.

[26] H. Li, C. J. Meininger, G. Wu, Rapid determination of nitrite by reversed-phase high-performance liquid chromatography with fluorescence detection, J. Chromatogr. B Biomed. Sci. Appl., 746 (2000) 199-207.

[27] H. Wang, W. Yang, S.-C Liang, Z.-M Zhang, H.-S Zhang, Spectrofluorimetric determination of nitrite with 5,6-diamino-1,3-naphthalene disulfonic acid, Anal. Chim. Acta, 419 (2000) 169-173.

[28] X.-Q Zhan, D.-H Li, H. Zheng, J.-G Xu, A sensitive fluorimetric method for the determination of nitrite and nitrate in seawater by a novel red-region fluorescence dye, Anal. Lett., 34 (2001) 2761-2770.

[29] C. Landgrafe, W. S. Sheldrick, Structure and reactions of the thioether half-sandwich ruthenium(II) complexes [Ru(MeCN)$_3$([9]aneS3)][CF$_3$SO$_3$]$_2$ and [Ru(MeCN)$_2$(PPh$_3$)([9]aneS3)][CF$_3$SO$_3$]$_2$ ([9]aneS3=1,4,7-trithiacyclononane), J. Chem. Soc. Dalton Trans., (1994) 1885-1893.

[30] O. V. Dolomanov, L. J. Bourhis, R. J. Gildea, J. A. K. Howard, H. Puschmann, OLEX2: a complete structure solution, refinement and analysis program, J. Appl. Cryst., 42 (2009) 339-341.

[31] G. M. Sheldrick, Acta Cryst., A short history of SHELX, A64 (2008) 112-122.

[32] G. M. Sheldrick, Acta Cryst., Crystal structure refinement with SHELXL, C71 (2015) 3-8.

[33] P. J. R. Phizackerley, S. A. Al-Dabbagh, The estimation of nitrate and nitrite in saliva and urine, Anal. Biochem., 131 (1983) 242-245.

[34] S.-C. Chan, P.-K. Pat, T.-C. Lau, C.-Y. Wong, Facile direct insertion of nitrosonium ion (NO$^+$) into a rutheniumaryl bond, Organometallics, 30 (2011) 1311-1314.

[35] S.-C. Chan, H.-Y. Cheung, C.-Y. Wong, Ruthenium complexes containing 2-(2-nitrosoaryl)pyridine: structural, spectroscopic, and theoretical studies, Inorg. Chem., 50 (2011) 11636-11643.

[36] S.-C. Chan, J. England, W.-C. Lee, K. Wieghardt, C.-Y. Wong, Noninnocent behavior of nitrosoarene-pyridine hybrid ligands: ruthenium complexes bearing a 2-(2-nitrosoaryl)pyridine monoanion radical, ChemPlusChem, 78 (2013) 214-217.

[37] Xue, Z., Wu Z., Han, S. A selective fluorogenic sensor for visual detection of nitrite, Anal. Methods, 4 (2012) 2021-2026.

[38] Chen, Z., Zhang, Z., Qu, C., Pan, D., Chen, L. Highly sensitive label-free colorimetric sensing of nitrite based on etching of gold nanorods, Analyst, 137 (2012) 5197-5200.

[39] Zhang, J., Yang, C., Chen, C., Yang, X. Determination of nitrite and glucose in water and human urine with light-up chromogenic response based on the expeditious oxidation of 3,3',5,5'-tetramethylbenzidine by peroxynitrous acid, Analyst, 138 (2013) 2398-2404.

[40] Li, T., Li, Y., Zhang, Y., Dong, C., Shen, Z., Wu, A. A colorimetric nitrite detection system with excellent selectivity and high sensitivity based on Ag@Au nanoparticles, Analyst, 140 (2015) 1076-1081.

The invention claimed is:

1. A complex comprising the following structure:

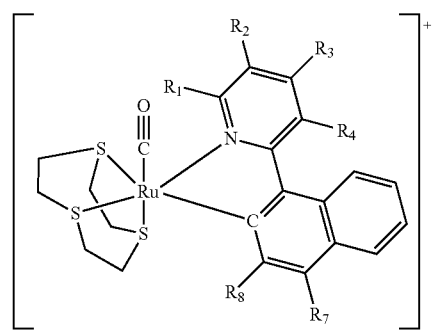

wherein R$_1$, R$_2$, R$_3$, R$_4$, R$_7$ and R$_8$ are independently selected from hydrogen, a halogen atom, a C1-C4 straight or branched alkyl group, a C1-C4 straight or branched alkoxyl group, a phenyl group or a heterocyclic group.

2. A complex according to claim 1, wherein the complex comprises the following structure:

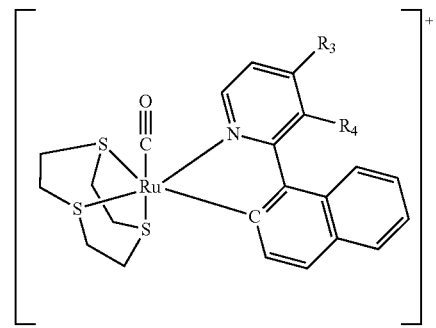

wherein R$_3$ and R$_4$ are independently selected from hydrogen, a halogen atom, or a C1-C4 straight or branched alkyl group.

3. A complex according to claim 1, wherein the complex comprises a structure of Formula (IV):

Formula (IV)

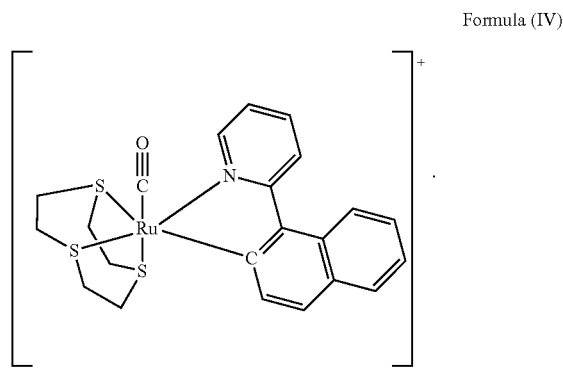

4. A complex according to claim 1, wherein the complex comprises a structure of Formula (VII):

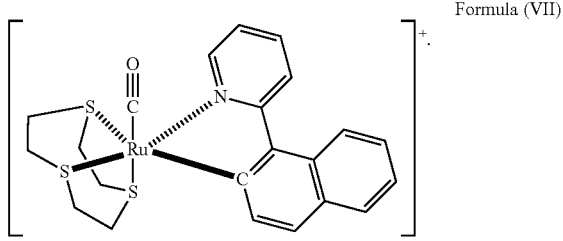

Formula (VII)

5. A complex according to claim 1, wherein the complex comprises [Ru(npy)([9]aneS3)(CO)][ClO₄], where npy is 2-(1-naphthyl)pyridine and [9]aneS3 is 1,4,7-trithiacyclononane.

6. A complex according to claim 1, wherein the complex is yellow in solution.

7. A dication comprising a structure of Formula (VIII):

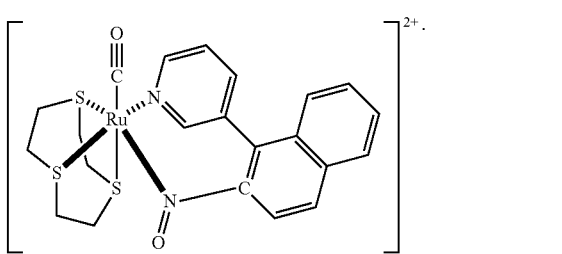

Formula (VIII)

8. A method for making the complex of claim 1, comprising the steps of:
   mixing [Ru([9]aneS3)(CH₃CN)₃](CF₃SO₃)₂, where [9]aneS3 is 1,4,7-trithiacyclononane, 2-(1-naphthyl)pyridine, and triethylamine (Et₃N) in a first solvent of dimethylformamide (DMF) to form a first solution;
   warming the first solution in an inert atmosphere;
   removing the first solvent from the first solution to form a green residue;
   subjecting the green residue to chromatography to collect a yellow band of eluate;
   adding a saturated aqueous sodium perchlorate (NaClO₄) solution to the collected yellow band of eluate to form yellow solids;
   charging the yellow solids with DMF into a pressurised container containing carbon monoxide (CO) gas to form an orange mixture;
   warming the orange mixture;
   removing solvent from the orange mixture to form yellow solids; and
   recrystallizing the yellow solids in a recrystallization solvent by slow diffusion of diethyl ether (Et₂O) into the recrystallization solvent to form pale yellow crystals.

9. The method according to claim 8, wherein the [Ru([9]aneS3)(CH₃CN)₃](CF₃SO₃)₂, 2-(1-naphthyl)pyridine, and Et₃N are mixed in a molar ratio of approximately 10:15:17, respectively.

10. The method according to claim 8, wherein the first solution is warmed at around 60° C. for about 18 hours.

11. The method according to claim 8, wherein the inert atmosphere comprises argon.

12. The method according to claim 8, wherein the first solvent is removed after the first solution is allowed to cool to room temperature.

13. The method according to claim 8, wherein the green residue is subjected to basic alumina column chromatography using acetone ((CH₃)CO) as eluent.

14. The method according to claim 13, wherein the eluent is removed under vacuum after the saturated aqueous NaClO₄ solution is added to the collected yellow band of eluate.

15. The method according to claim 8, wherein the CO gas is pressurised at 3 bar.

16. The method according to claim 8, wherein the orange mixture is warmed at around 120° C. for about 18 hours.

17. The method according to claim 8, wherein the recrystallization solvent in which the pale yellow crystals are formed is an acetonitrile solution.

18. A method for detecting nitrite, comprising the steps of:
   adding an acid and a sample to a solution comprising the complex according to claim 1 to form a detection solution;
   mixing the detection solution at room temperature; and
   checking the detection solution for any change in colour.

19. A method according to claim 18, wherein the acid is hydrochloric acid and the complex comprises a structure of Formula (VII):

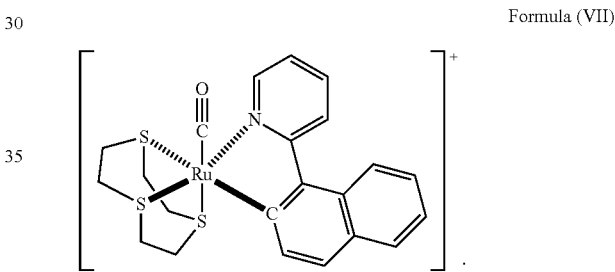

Formula (VII)

20. The method according to claim 18, wherein 1 mL of hydrochloric acid at a concentration of 1 mol L⁻¹ and 0.2 mL of sample solution are added to 0.2 mL of a [Ru(npy)([9]aneS3)(CO)]⁺ solution.

21. The method according to claim 18, wherein the detection solution changes from yellow to red if the sample contains nitrite.

22. The method according to claim 21, wherein a dynamic detection range for a change in colour of the detection solution is 1-840 μmol L⁻¹ nitrite.

23. The method according to claim 21, wherein a change in colour of the detection solution is determined by the naked eye.

24. The method according to claim 21, wherein a change in colour of the detection solution is determined by a spectrophotometer measured in the range of 450-550 nm.

25. The method according to claim 24, wherein a change in colour of the detection solution is determined by a spectrophotometer measured at around 483 nm.

26. The method according to claim 21, wherein the colour of the detection solution is stabilised by adding ammonia solution to neutralise and/or alkalinize the detection solution.

* * * * *